US012739014B2

(12) United States Patent
Tao et al.

(10) Patent No.: US 12,739,014 B2
(45) Date of Patent: Sep. 15, 2026

(54) POSITIONING BEAM MANAGEMENT

(71) Applicant: Nokia Technologies Oy, Espoo (FI)

(72) Inventors: Tao Tao, Shanghai (CN); Yan Meng, Shanghai (CN); Jianguo Liu, Shanghai (CN); Ryan Keating, Naperville, IL (US); Diomidis Michalopoulos, Munich (DE)

(73) Assignee: Nokia Technologies Oy, Espoo (FI)

( * ) Notice: Subject to any disclaimer, the term of this patent is extended or adjusted under 35 U.S.C. 154(b) by 350 days.

(21) Appl. No.: 18/546,677

(22) PCT Filed: Mar. 22, 2021

(86) PCT No.: PCT/CN2021/082002
§ 371 (c)(1),
(2) Date: Aug. 16, 2023

(87) PCT Pub. No.: WO2022/198362
PCT Pub. Date: Sep. 29, 2022

(65) Prior Publication Data

US 2024/0147254 A1 May 2, 2024

(51) Int. Cl.
*H04B 7/06* (2006.01)
*H04L 5/00* (2006.01)
*H04W 16/28* (2009.01)

(52) U.S. Cl.
CPC ....... *H04B 7/06964* (2023.05); *H04L 5/0051* (2013.01); *H04W 16/28* (2013.01)

(58) Field of Classification Search
CPC .. H04B 7/06964; H04L 5/0051; H04W 16/28; H04W 48/14; H04W 24/04; H04W 48/12
USPC ........................................ 370/310, 328, 329
See application file for complete search history.

(56) References Cited

U.S. PATENT DOCUMENTS

2020/0128423 A1 4/2020 Zhang et al.
2020/0374806 A1* 11/2020 Manolakos ......... H04W 52/325
2021/0409967 A1* 12/2021 Franke .................. H04W 16/28
2023/0171836 A1* 6/2023 Butt ....................... H04B 7/088 370/216

(Continued)

FOREIGN PATENT DOCUMENTS

CN 111629413 A 9/2020
WO 2018/204255 A1 11/2018
WO 2021/228406 A1 11/2021

OTHER PUBLICATIONS

"New SID on NR Positioning Enhancements", 3GPP TSG RAN Meeting #86, RP-193237, Agenda: 9.1.1, Qualcomm Incorporated, Dec. 9-12, 2019, 4 pages.

(Continued)

*Primary Examiner* — Obaidul Huq
(74) *Attorney, Agent, or Firm* — Robert P. Michal, Esq.; Rimon PC

(57) ABSTRACT

Embodiments of the present disclosure relate to a method, apparatus and computer readable storage medium for positioning beam management. According to embodiments of the present disclosure, a terminal device determines signal quality and a time of arrival of a positioning reference signal received from a network device and identifies a positioning beam failure based at least in part on the determined signal quality and the time of arrival of the positioning reference signal.

15 Claims, 6 Drawing Sheets

(56) References Cited

U.S. PATENT DOCUMENTS

| | | | | |
|---|---|---|---|---|
| 2023/0204705 | A1* | 6/2023 | Thomas | H04L 5/0048 342/450 |
| 2023/0217403 | A1 | 7/2023 | Koskela et al. | |
| 2024/0072870 | A1* | 2/2024 | Thomas | H04B 17/364 |

OTHER PUBLICATIONS

"On Demand Transmission of PRS for NR", 3GPP TSG-RAN WG2 Meeting #105, R2-1901373, Agenda: 11.8.2, Qualcomm Incorporated, Feb. 25-Mar. 1, 2019, pp. 1-15.
"Co-Ordination Among UE, gNB and Location Server for PRS Configuration and Feedbacks", 3GPP TSG RAN WG2#105, R2-1901533, Agenda: 11.8.3, Ericsson, Feb. 25-Mar. 1, 2019, pp. 1-3.
"Potential positioning enhancements", 3GPP TSG RAN WG1 #103-e, R1-2008083, Agenda: 8.5.3, Xiaomi, Oct. 26-Nov. 13, 2020, 5 pages.
"Potential positioning enhancements", 3GPP TSG RAN WG1 Meeting #103-e, R1-2008710, Agenda: 8.5.3, Fraunhofer IIS, Oct. 26-Nov. 13, 2020, 17 pages.
"3rd Generation Partnership Project; Technical Specification Group Radio Access Network; NR; Physical layer measurements (Release 16)", 3GPP TS 38.215, V16.4.0, Dec. 2020, pp. 1-25.
International Search Report and Written Opinion received for corresponding Patent Cooperation Treaty Application No. PCT/CN2021/082002, dated Dec. 22, 2021, 8 pages.
"On Potential NR Positioning Enhancements", 3GPP TSG RAN WG1#103-e, R1-2007998, Agenda: 8.5.3, Lenovo, Oct. 26-Nov. 13, 2020, pp. 1-9.

* cited by examiner

POSITIONING BEAM MANAGEMENT

RELATED APPLICATION

This application was originally filed as PCT Application No. PCT/CN2021/082002, filed on Mar. 22, 2021, which is incorporated herein by reference in its entirety.

TECHNICAL FIELD

Embodiments of the present disclosure generally relate to the field of telecommunications, and in particular, to methods, apparatuses and computer readable media for positioning beam management.

BACKGROUND

The concept of on-demand/dynamic positioning reference signal (PRS) has been discussed a lot for New Radio (NR) systems. The concept of on-demand PRS states that PRSs are transmitted only to the direction where there is at least one terminal device (for example, UE) which will receive and process them for deriving the location of the terminal device (either at the terminal device itself or at a network device after the measurements are reported to the network device). Similarly, the concept of dynamic PRS states that in case there is a need for stronger reception of PRSs (for example, for high accuracy), the network device can provide increased PRS resources to the designated areas. In NR systems, transmitting PRSs from all beams of a serving cell would result in a waste of resources. Therefore, on-demand/dynamic PRS can be a resource-efficient approach for positioning.

SUMMARY

In general, example embodiments of the present disclosure provide methods, apparatuses and computer readable media for positioning beam management.

In a first aspect, there is provided a method. The method comprises determining, at a terminal device, signal quality and a time of arrival of a positioning reference signal received from a network device; and identifying a positioning beam failure based at least in part on the determined signal quality and the time of arrival of the positioning reference signal.

In a second aspect, there is provided a terminal device. The terminal device comprises at least one processor and at least one memory including computer program codes. The at least one memory and the computer program codes are configured to, with the at least one processor, cause the terminal device to determine signal quality and a time of arrival of a positioning reference signal received from a network device; and identifying a positioning beam failure based at least in part on the determined signal quality and the time of arrival of the positioning reference signal.

In a third aspect, there is provided an apparatus. The apparatus comprises means for determining signal quality and a time of arrival of a positioning reference signal received from a network device; and means for identifying a positioning beam failure based at least in part on the determined signal quality and the time of arrival of the positioning reference signal.

In a fourth aspect, there is provided a computer program product that is stored on a computer readable medium and includes machine-executable instructions. The machine-executable instructions, when being executed, cause a machine to determine signal quality and a time of arrival of a positioning reference signal received from a network device; and identifying a positioning beam failure based at least in part on the determined signal quality and the time of arrival of the positioning reference signal.

In a fifth aspect, there is a computer readable storage medium comprising program instructions stored thereon. The instructions, when executed by an apparatus, cause the apparatus to determine signal quality and a time of arrival of a positioning reference signal received from a network device; and identifying a positioning beam failure based at least in part on the determined signal quality and the time of arrival of the positioning reference signal.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
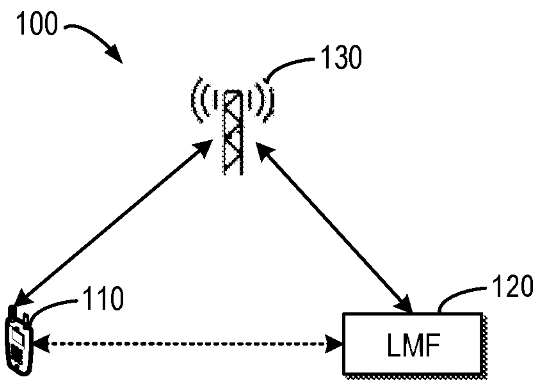
FIG. 1 illustrates an example communication network in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Transmission Reception Point (TRP), a Remote Radio Unit (RRU), a radio header (RH), a remote radio head (RRH), a relay, a low power node such as a femto, a pico, and so forth, depending on the applied terminology and technology. In the following description, the terms "network device", "BS", and "node" may be used interchangeably.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IOT device or fixed IOT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 illustrates an example communication network 100 in which example embodiments of the present disclosure can be implemented. The communication network 100 includes a terminal device 110, a location management function (LMF) 120 and one or more network devices 130 (only one network device 130 is shown in FIG. 1). The network device 130 may provide one or more cells to serve the terminal device 110. It is to be understood that the number of network devices and/or terminal devices is given for the purpose of illustration without suggesting any limitation to the scope of the present disclosure. The communication network 100 may include any suitable number of network devices and/or terminal devices adapted for implementing implementations of the present disclosure. The LMF 120 can be implemented in a core network or in a Radio Access Network (RAN). If the LMF 120 is implemented in a RAN, it may be referred to as a local management component (LMC).

In the communication network 100 as shown in FIG. 1, the network device 110 can communicate data and/or control information to the terminal device 120 and the terminal device 120 can also communication data and/or control information to the network device 110. A link from the network device 110 to the terminal device 120 is referred to as a downlink (DL), while a link from the terminal device 120 to the network device 110 is referred to as an uplink (UL).

A DL positioning procedure can be performed in the communication network 100. For example, the network devices 130 may transmit DL signals to the terminal device 110. Examples of the DL signals may include DL PRS (for example, on-demand PRS), synchronization signal blocks (SSBs) or any other DL signals used for positioning. The terminal device 110 may measure the DL signals and generate a positioning measurement report. The terminal device 110 may transmit the positioning measurement report to the LMF 120 and thus the LMF 120 can estimate the position of the terminal device 110 based on the positioning measurement report. The communications between the terminal device 110 and the LMF 120 may be implemented over a positioning protocol, such as, LTE Positioning Protocol (LPP). For example, the terminal device 110 may transmit, via the network device 130, the positioning measurement report to the LMF 120 over LPP.

It is to be understood that, any suitable positioning technique currently known or to be developed in the future can be used for positioning the terminal device 110. It is also to be understood that, on-demand PRS can be used with, for example, downlink time difference of arrival (DL-TDOA), multi-cell round trip time (RTT), downlink angle-of-departure (DL-AOD) or any other positioning technique which uses DL PRS.

Figure 2A:
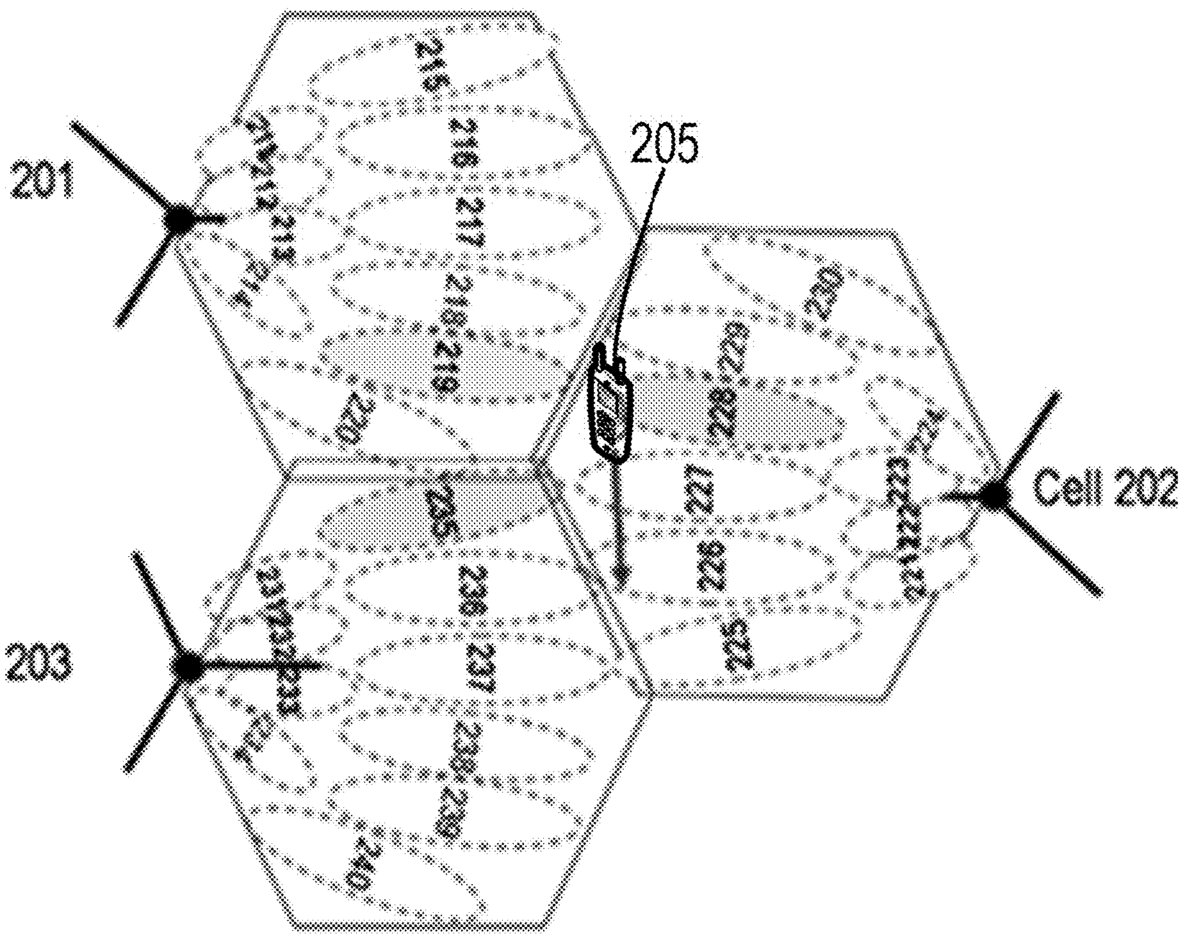
FIG. 2A and FIG. 2B illustrate the case of a mobile terminal device receiving on-demand PRSs from multiple cells.
Figure 2B:
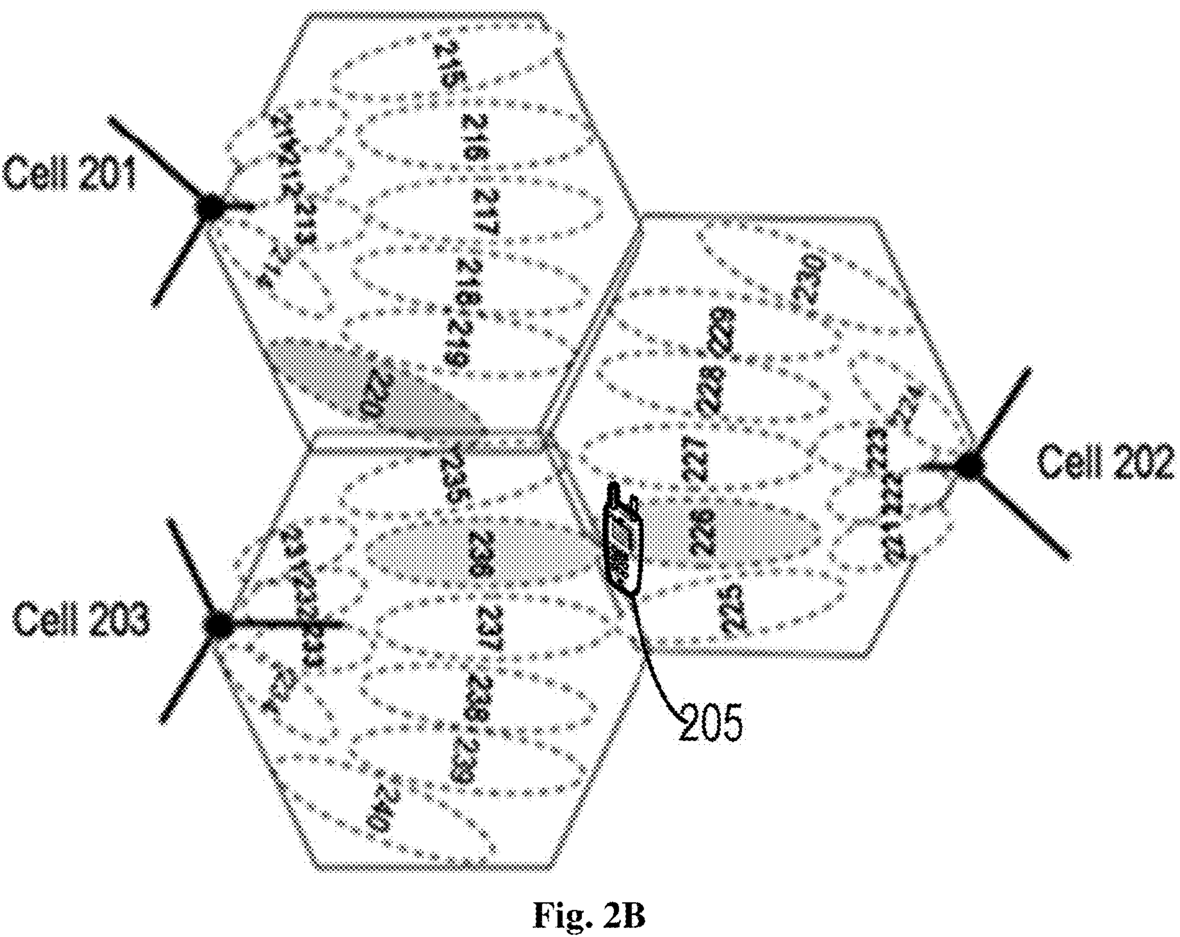

As described above, the concept of on-demand PRS implies that only limited PRS resources (associated with specific transmit beamforming) will be used by a terminal device for positioning. For positioning a mobile target UE, transmit beamforming needs to be updated according to the UE's changing location. FIG. 2A and FIG. 2B illustrate the case of a mobile target UE receiving on-demand PRSs from three cells. As shown in FIG. 2A, three cells 201, 202 and 203 are provided by one or more network device (not shown in FIG. 2A) for serving a UE 205. Beams 219, 228 and 235 are used for conveying PRSs, while other beams are not used for conveying PRSs. As shown in FIG. 2B, the UE 205 moves. For achieving efficiency of PRS resources and sufficient signal reception at the UE 205, the beams for transmitting PRSs from the cells 201, 202 and 203 need to be updated according to the latest location of the UE 205. For example, according to the latest location of the UE 205, beams 220, 226 and 236 may be used for conveying PRSs.

NR defines a self-contained beam management procedure for data communication. When a UE is suffering from a poor channel condition (for example, the L1-Reference Signal Received Power for the connected beam goes below a certain level), a beam failure indication will be triggered from the lower layer. At the same time, the UE search another candidate beam with good quality. If a predefined number of beam failures are detected, a beam failure recovery process will be triggered with the candidate beam based on a random access procedure. Then, the gNB will transmit a DL assignment or UL grant over a Physical Downlink Control Channel (PDCCH) to end the beam failure recovery. However, the self-contained beam management procedure is mainly for communication between the UE and the serving gNB. In particular, in the legacy beam management procedure, direct communication between the UE and a neighboring gNB/TRP is not considered. Therefore, the legacy beam management procedure cannot be applied to on-demand PRSs from neighboring gNBs/TRPs.

Figure 3:
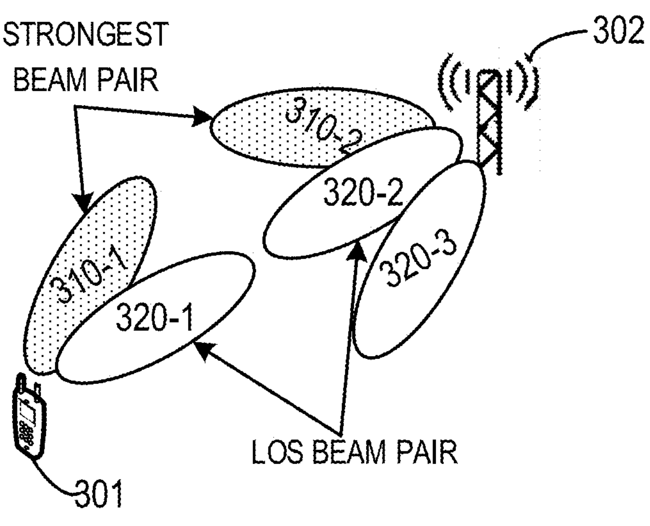
FIG. 3 illustrates an example of performing beam management according to a legacy solution.

Further, in NR, beam management is based on a criterion related to the highest Reference Signal Received Power (RSRP)/Signal to interference and noise ratio (SINR). The highest RSRP/SINR may be desirable for data communication, but not necessarily for positioning. FIG. 3 illustrates an example of the case. As shown in FIG. 3, according to the legacy criteria for the beam management procedure, a pair of beams 310-1 and 310-2 may be selected, since they are associated with the highest RSRP/SINR. However, the selected pair of beams 310-1 and 310-2 is not a Line of Sight (LOS) beam pair. For example, the LOS beam pair may be beams 320-1 and 320-2. With the Non-LOS (NLOS) beam pair (that is, the selected pair of beams 310-1 and 310-2), it is impossible to get the correct LOS path for positioning. In order to achieve high accuracy of positioning, it is very important to find the LOS beam pair. Therefore, the use of the highest PSRP/SINR rule for positioning beam management is not optimal and may cause the NLOS beam pair to be selected.

Embodiments of the present disclosure provide a solution for positioning beam management, which can solve the above problem and one or more of other potential problems. This solution provides a mechanism for identifying and reporting a positioning beam failure on the UE side. In particular, this solution proposes a new criterion for identifying a positioning beam failure, which not only considers the signal quality (for example, RSRP of the PRS) but also considers the time of arrival (ToA) measurement of the PRS. Adding the ToA measurement into the criteria can help to identify the LOS/NLOS characteristic, which is more important for the purpose of positioning. Moreover, this solution enables a beam management report to be transmitted from the UE to the LMF or the serving network device, which comprises not only an indication of the positioning beam failure but also other information to help the LMF or the serving network device identify potential beamforming impairment.

Figure 4:
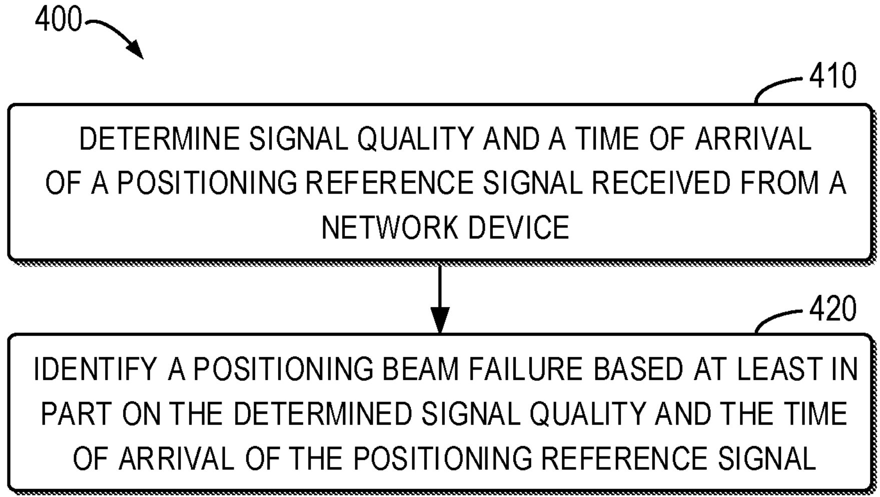
FIG. 4 illustrates a flowchart of an example method according to some example embodiments of the present disclosure.

FIG. 4 shows a flowchart of an example method 400 in accordance with some example embodiments of the present disclosure. The method 400 can be implemented at a terminal device, for example, the terminal device 110 shown in FIG. 1. It is to be understood that the method 400 may include additional blocks not shown and/or may omit some shown blocks, and the scope of the present disclosure is not limited in this regard.

At block 410, the terminal device 110 determines signal quality and a time of arrival of a positioning reference signal received from a network device. For example, the network device may be the network device 130 shown in FIG. 1 which serves the terminal device 110 or a neighboring network device (for example, gNB or TRP) not shown in FIG. 1. Examples of the positioning reference signal may include DL PRS (for example, on-demand PRS) or any DL signal (for example, SSB) used for positioning. In the following, DL PRS will be taken as an example of the positioning reference signal.

In some example embodiments, for example, the terminal device 110 may measure RSRP and the relative time of arrival (RTOA) of the positioning reference signal. In the following, RSRP will be taken as an example indicator of the signal quality, while RTOA will be taken as an example indicator of the time of arrival. As used herein, the term "RTOA" may have a similar definition to RTOA defined in TS 38.215 of the 3GPP specifications, or to Reference Signal Time Difference (RSTD) defined in TS 38.215 of the 3GPP specifications. For example, the terminal device 110 may measure the relative time of arrival of multiple PRS resources to determine the RTOA of DL PRS. It is to be understood that other indicators than RSRP and/or RTOA can be used in some other embodiments. The scope of the present disclosure is not limited in this aspect.

At block 420, the terminal device 110 identifies a positioning beam failure based at least in part on the determined signal quality and the time of arrival of the positioning reference signal.

In some example embodiments, the terminal device 110 may receive, from the network device 130 or the LMF 120, a configuration about a criterion for positioning beam failure identification. For example, the configuration may indicate at least one threshold related to the signal quality and/or the time of arrival for identifying a positioning beam failure. The terminal device 110 may identify a positioning beam failure based at least in part on the determined signal quality and the time of arrival of the positioning reference signal according to the configured criteria. Alternatively, in some other embodiments, the criterion for positioning beam failure identification may be pre-configured at the terminal device 110. Thus, the network device 130 or the LMF 120 may not need to transmit a configuration about the criterion to the terminal device 110.

In some example embodiments, in accordance with a determination that the signal quality (for example, RSRP) is below a first threshold and the time of arrival (for example, RTOA) of the positioning reference signal exceeds a time of arrival of a previously measured positioning reference signal by at least a second threshold, the terminal device 110 may identify that a positioning beam failure occurs.

In some example embodiments, in accordance with a determination that the signal quality (for example, RSRP) is below the first threshold and a difference between the time of arrival (for example, RTOA) of the positioning reference signal and a time of arrival of a previously measured positioning reference signal is below a threshold difference (that is, the time of arrival almost does not change), the terminal device 110 may identify that a positioning beam associated with the positioning reference signal is blocked by obstacles.

In some example embodiments, in accordance with a determination that the signal quality (for example, RSRP) exceeds the first threshold and the time of arrival (for example, RTOA) of the positioning reference signal exceeds a time of arrival of a previously measured positioning reference signal by at least the second threshold, the terminal device 110 may identify that a positioning beam failure is about to occur. For example, in this case, the terminal device 110 may identify that a positioning beam failure will occur within X milliseconds (where X>0, for example, X=5). In this case, for example, the relatively high RSRP means that the terminal device 110 is still in the coverage of the current beam. However, considering RTOA changes a lot, the terminal device 110 may be moving and may be going to move out of the coverage of the current beam.

In some example embodiments, in accordance with a determination that the time of arrival (for example, RTOA) of the positioning reference signal exceeds the time of arrival of the previously measured positioning reference signal by at least a third threshold, the terminal device 110 may identify that a positioning beam failure occurs or at least prepare a corresponding beam management report to the LMF 120 or the serving network device 130. For example, the third threshold may exceed the second threshold. In this case, the RTOA gets quite large relative to the previously measured one, which means that the terminal device 110 has either moved a lot or a significant environment change occurs.

In some example embodiments, in accordance with a determination that the signal quality exceeds the first threshold and a difference between the time of arrival (for example, RTOA) of the positioning reference signal and a time of arrival of a previously measured positioning reference signal is below the threshold difference (that is, the time of arrival almost does not change), the terminal device 110 may do nothing.

In some example embodiments, at least one of the first, second and third thresholds may be configured to the terminal device 110 by the LMF 120 or the network device 130 as described above. In some example embodiments, at least one of the first, second and third thresholds may be bandwidth dependent. In some embodiments, at least one of the first, second and third thresholds may be different per network device (for example, per gNB/TRP).

In some example embodiments, measurements on other signals (for example, SSBs or the like) may also be taken into consideration for identifying a positioning beam failure. For example, in some example embodiments, the terminal device 110 may determine a time of arrival (for example, RTOA) of at least one other signal received from the network device 130. In some example embodiments, the at least one other signal may be at least one SSB, or any other suitable signal for positioning. In some example embodiments, the at least one SSB used by the terminal device 110 may correspond to a prior PRS configuration (for example, when the on-demand PRS is initially set up) and have some quasi co-location relation with the PRS. For example, the terminal device 110 may save the associated SSB of the PRS candidates that it initially measured and uses those SSBs for RTOA monitoring. In accordance with a determination that the time of arrival of the positioning reference signal exceeds by the time of arrival of the at least one other signal by at least a fourth threshold, the terminal device 110 may identify that a positioning beam failure occurs. For example, the fourth threshold may be configured to the terminal device 110 by the LMF 120 or the network device 130. The fourth threshold may be bandwidth dependent and/or may be different per network device (for example, per gNB/TRP). Further, the terminal device 110 may determine, based on the at least one other signal, an alternative beam for the positioning beam associated with the positioning reference signal. Information about the alternative beam (for example, an identifier of the preferable SSB) may be included in a beam management report and transmitted to the LMF 120 or the network device 130 for new beamforming determination.

It is to be noticed that the bandwidth of SSB may be much narrower than the bandwidth of PRS. Therefore, the RTOA of the SSB may not be accurate enough. Such additional measurements on SSBs could be optional, to double check the positioning beam failure identification. In some example embodiments, SSBs can be taken as positioning reference signals and a group of thresholds can be applied to the measurements on SSBs to identify a positioning beam failure, which is similar as the way described with reference to DL PRS. In some example embodiments, the thresholds related to SSBs may be adjusted to account for the accuracy difference. For example, the threshold related to the RTOA of SSB may exceed the threshold related to the RTOA of DL PRS.

In some example embodiments, in response to identifying that a positioning beam failure occurs or is about to occur, the terminal device 110 may transmit a beam management report indicating the positioning beam failure to at least one of the LMF 120 and the network device 130. Alternatively, or in addition, the beam management report about the positioning beam may be transmitted to the LMF 120 as information that is piggybacked to each positioning measurement report. In some example embodiments, the beam management report may comprise information about the current positioning beam. For example, the information about the current positioning beam may indicate whether a failure of the positioning beam occurs or not, whether a failure of the positioning beam is about to occur or not, whether the positioning beam is blocked by obstacles or not, and/or a probability of a positioning beam failure. Alternatively, or in addition, the beam management report may comprise an indication that the positioning beam is a LOS beam or a NLOS beam (for example, "0" means a LOS beam and "1" means a NLOS beam), or an indication of a probability that the positioning beam is a LOS beam or a NLOS beam. Alternatively, or in addition, the beam management report may comprise information about an alternative beam for replacing the current positioning beam. For example, the information about the alternative beam may comprise an identifier of a preferable SSB, or preferable quasi co-location parameters. It is to be understood that, other information related to positioning beam management can also be included in the beam management report. The scope of the present disclosure is not limited in this aspect.

When the terminal device 110 transmits the beam management report to the LMF 120 or the network device 130 (for example, gNB or TRP), several options about the report occasion can be considered.

In some example embodiments, the beam management report may be transmitted together with the positioning measurement report, for example, the LPP Provide Location Information message. Alternatively, in some example embodiments, the beam management report may be transmitted separately in a new message via LPP. For example, the LMF 120 or the network device 130 may transmit a configuration about the beam management report to the terminal device 110. Thus, the terminal device 110 may transmit the beam management report to the LMF 120 or the network device 130 based on the received configuration. Alternatively, in some example embodiments, the beam management report may be transmitted to the serving network device 130 via Radio Resource Control (RRC) signaling or via a Media Access Control (MAC) control element.

In some example embodiments, the beam management report about the positioning beam failure may cause the LMF 120 or the network device 130 to notify at least one other network device of the positioning beam failure, such that the least one other network device performs an operation for recovering the positioning beam failure. In some example embodiments, in response to receiving the beam management report indicating a positioning beam failure from the terminal device 110, the LMF 120 or the network device 130 may transmit, to one or more neighboring network devices (for example, gNBs or TRPs), an indication of the positioning beam failure, for example, via New Radio Positioning Protocol A (NRPPa) or an Xn interface. The neighboring network devices may reconfigure on-demand PRS Tx beamforming accordingly or perform beam sweeping for training a new Tx beamforming for on-demand PRS.

It can be seen that embodiments of the present disclosure provide a solution for positioning beam management. This solution provides a mechanism for identifying and reporting a positioning beam failure on the UE side. In particular, this solution proposes a new criterion for identifying a positioning beam failure, which not only considers the signal quality (for example, RSRP of the PRS) but also considers the time of arrival (ToA) measurement of the PRS. Adding the ToA measurement into the criteria can help to identify the LOS/NLOS characteristic, which is more important for the purpose of positioning. Moreover, this solution enables a beam management report to be transmitted from the UE to the LMF or the serving network device, which comprises not only an indication of the positioning beam failure but also other information to help the LMF or the serving network device identify potential beamforming impairment.

In some example embodiments, the apparatus capable of performing the method 400 (for example, the terminal device 110) comprises: means for determining signal quality and a time of arrival of a positioning reference signal received from a network device; and means for identifying a positioning beam failure based at least in part on the determined signal quality and the time of arrival of the positioning reference signal.

In some example embodiments, the means for identifying a positioning beam failure comprises: means for in accordance with a determination that the signal quality is below a first threshold and the time of arrival of the positioning reference signal exceeds a time of arrival of a previously measured positioning reference signal by at least a second threshold, identifying that a positioning beam failure occurs.

In some example embodiments, the means for identifying a positioning beam failure comprises: means for in accordance with a determination that the signal quality is below the first threshold and a difference between the time of arrival of the positioning reference signal and a time of arrival of a previously measured positioning reference signal is below a threshold difference, identifying that a positioning beam associated with the positioning reference signal is blocked.

In some example embodiments, the means for identifying a positioning beam failure comprises: means for in accordance with a determination that the signal quality exceeds the first threshold and the time of arrival of the positioning reference signal exceeds a time of arrival of a previously measured positioning reference signal by at least the second threshold, identifying that a positioning beam failure is about to occur.

In some example embodiments, the means for identifying a positioning beam failure comprises: means for in accordance with a determination that the time of arrival of the positioning reference signal exceeds the time of arrival of the previously measured positioning reference signal by at least a third threshold, wherein the third threshold is below the second threshold, identifying that a positioning beam failure occurs.

In some example embodiments, the apparatus capable of performing the method 400 further comprises: means for receiving, from at least one of the network device and a location management function, a configuration indicating at least one of the first, second and third thresholds.

In some example embodiments, at least one of the first, second and third thresholds is bandwidth dependent.

In some example embodiments, the apparatus capable of performing the method 400 further comprises: means for determining a time of arrival of at least one other signal received from the network device; and means for in accordance with a determination that the time of arrival of the positioning reference signal exceeds the time of arrival of the at least one other signal by at least a fourth threshold, identifying that a positioning beam failure occurs.

In some example embodiments, the at least one other signal comprises at least one synchronization signal block.

In some example embodiments, the apparatus capable of performing the method 400 further comprises: means for determining, based on the at least one other signal, an alternative beam for a positioning beam associated with the positioning reference signal.

In some example embodiments, the time of arrival comprises a relative time of arrival.

In some example embodiments, the apparatus capable of performing the method 400 further comprises: means for in response to identifying that a positioning beam failure occurs or is about to occur, transmitting a beam management report about the positioning beam failure to at least one of a location management function and the network device.

In some example embodiments, the beam management report about an identified positioning beam failure causes the location management function or the network device to notify at least one other network device of the positioning beam failure, such that the least one other network device performs an operation for recovering the positioning beam failure.

In some example embodiments, the apparatus capable of performing the method 400 further comprises: means for transmitting a positioning measurement report to a location management function, wherein the positioning measurement report comprises a beam management report about a positioning beam associated with the positioning reference signal.

In some example embodiments, the beam management report comprises at least one of the following: information about a positioning beam associated with the positioning reference signal; an indication that the positioning beam is a Line of Sight beam or a Non Line of Sight beam; and information about an alternative beam for the positioning beam.

In some example embodiments, the beam management report about an identified positioning beam failure causes the location management function or the network device to notify at least one other network device of the positioning beam failure, such that the least one other network device performs an operation for recovering the positioning beam failure.

Figure 5:
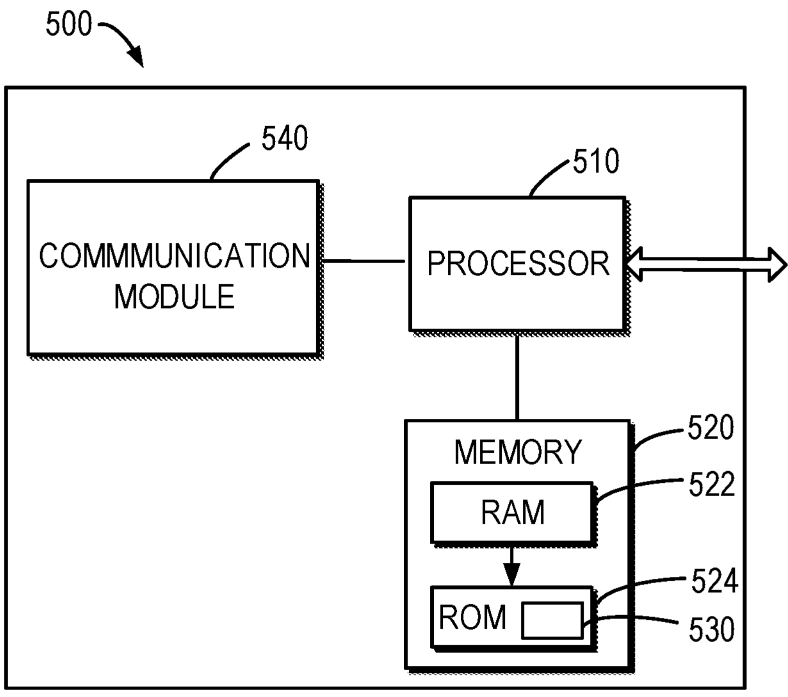
FIG. 5 illustrates a simplified block diagram of an apparatus that is suitable for implementing embodiments of the present disclosure.
Figure 6:
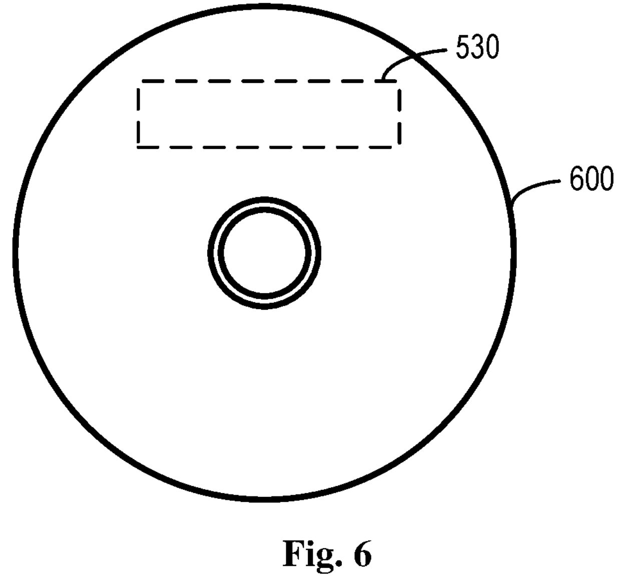
FIG. 6 illustrates a block diagram of an example computer readable medium in accordance with some example embodiments of the present disclosure.

FIG. 5 is a simplified block diagram of a device 500 that is suitable for implementing embodiments of the present disclosure. For example, the terminal device 110, the LMF 120 and/or the network device 130 shown in FIG. 1 can be implemented by the device 500. As shown, the device 500 includes one or more processors 510, one or more memories 520 coupled to the processor 510, and one or more communication modules 540 coupled to the processor 510.

The communication module 540 is for bidirectional communications. The communication module 540 has at least one antenna to facilitate communication. The communication interface may represent any interface that is necessary for communication with other network elements.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 524. The processor 510 may perform any suitable actions and processing by loading the program 530 into the RAM 522.

The embodiments of the present disclosure may be implemented by means of the program 530 so that the device 500 may perform any process of the disclosure as discussed with reference to FIG. 4. The embodiments of the present disclosure may also be implemented by hardware or by a combination of software and hardware.

In some example embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 530 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the device 500 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or a radio access networks. In an embodiment, at least some of the described processes may be performed by the central unit. In another embodiment, the device 500 may be instead comprised in the distributed unit, and at least some of the described processes may be performed by the distributed unit.

In an embodiment, the execution of at least some of the functionalities of the device 500 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the device 500 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 400 as described above with reference to FIG. 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus comprising:

at least one processor; and at least one memory storing instructions that, when executed by the at least one processor, cause the apparatus at least to perform:

determining signal quality and a time of arrival of a positioning reference signal received from a network device, wherein the positioning reference signal includes an on-demand positioning reference signal used for positioning;

measuring reference signal received power and the relative time of arrival of the on-demand positioning reference signal;

identifying a positioning beam failure based at least in part on the determined signal quality and the determined time of arrival of the positioning reference signal;

receiving from the network device a configuration about a criterion for position beam failure identification which indicates at least one threshold related to the signal quality and the time of arrival for identifying a position beam failure;

identifying a positioning beam failure based at least on the determined signal quality and the time of arrival of the positioning reference signal according to the configured criterion and the pre-configured criterion stored in the apparatus;

identifying a positioning beam failure based at least on a determination that the determined signal quality is below a first threshold and the time of arrival of the positioning reference signal exceeds a time of arrival of a previously measured positioning reference signal by at least a second threshold;

identifying that a positioning beam associated with the positioning reference signal is blocked based at least on a determination that the signal quality is below the first threshold and a difference between the time of arrival of the positioning reference signal and a time of arrival of a previously measured positioning reference signal is below a threshold difference;

identifying that a positioning beam failure is about to occur based at least on a determination that the signal quality exceeds the first threshold and the time of arrival of the positioning reference signal exceeds a time of arrival of a previously measured positioning reference signal by at least the second threshold;

identifying that a positioning beam failure has occurred based at least on a determination that the time of arrival of the positioning reference signal exceeds the time of arrival of the previously measured positioning reference signal by at least a third threshold which exceeds the second threshold, which indicates that the apparatus has one of moved a significant amount or a significant environment change has occurred;

identify that no action needs to be taken based at least on a determination that the signal quality exceeds the first threshold and a difference between the time of arrival of the positioning reference signal and a time of arrival of a previously measured positioning reference signal is below the threshold difference such that the time of arrival does not substantially change; and transmitting a beam management report about the identified positioning beam failure, wherein the transmission of the beam management report occurs by at least one of a direct transmission to the network device or in conjunction with the position measurement report, and wherein the beam management report is transmitted at least one of individually or with the positioning measurement report by at least one of LTE Positioning Protocol, Radio Resource Control signaling or a Media Access Control element, wherein at least one of the first, second and third thresholds is bandwidth dependent; and wherein at least one of the first, second and third thresholds is determined based upon the network device being utilized.

2. The apparatus of claim 1, wherein the at least one memory stores instructions that, when executed by the at least one processor, cause the apparatus at least to perform:

receiving, from at least one of the network device or a location management function, a configuration indicating at least one of the first, second or third thresholds.

3. The apparatus of claim 1, wherein the at least one memory stores instructions that, when executed by the at least one processor, cause the apparatus at least to perform:

determining a time of arrival of at least one other signal received from the network device; and in accordance with a determination that the time of arrival of the positioning reference signal exceeds the time of arrival of the at least one other signal by at least a threshold, identifying that the positioning beam failure occurs.

4. The apparatus of claim 3, wherein the at least one other signal comprises at least one synchronization signal block.

5. The apparatus of claim 3, wherein the at least one memory stores instructions that, when executed by the at least one processor, cause the apparatus at least to perform:

determining, based on the at least one other signal, an alternative beam for a positioning beam associated with the positioning reference signal.

6. The apparatus of claim 1, wherein the determined time of arrival comprises a relative time of arrival.

7. The apparatus of claim 1, wherein the transmitting the beam management report comprises:

in response to identifying that the positioning beam failure occurs or is about to occur, transmitting the beam management report about the identified positioning beam failure to at least one of a location management function or the network device.

8. The apparatus of claim 1, wherein the at least one memory stores instructions that, when executed by the at least one processor, cause the apparatus at least to perform:

transmitting a positioning measurement report to a location management function, wherein the positioning measurement report comprises a beam management report about a positioning beam associated with the positioning reference signal.

9. The apparatus of claim 8, wherein the beam management report comprises at least one of the following:

information about a positioning beam associated with the positioning reference signal;

an indication that the positioning beam is a Line of Sight beam or a Non Line of Sight beam; or information about an alternative beam for the positioning beam.

10. The apparatus of claim 8, wherein the beam management report about an identified positioning beam failure causes the location management function or the network device to notify at least one other network device of the identified positioning beam failure, such that the least one other network device performs an operation for recovering the identified positioning beam failure.

11. A method comprising:

determining, at a terminal device, signal quality and a time of arrival of a positioning reference signal received from a network device, wherein the positioning reference signal includes an on-demand positioning reference signal used for positioning;

measuring reference signal received power and the relative time of arrival of the on-demand positioning reference signal;

identifying a positioning beam failure based at least in part on the determined signal quality and the determined time of arrival of the positioning reference signal;

receiving from the network device a configuration about a criterion for position beam failure identification which indicates at least one threshold related to the signal quality and the time of arrival for identifying a position beam failure;

identifying a positioning beam failure based at least on the determined signal quality and the time of arrival of the positioning reference signal according to the configured criterion and the pre-configured criterion stored in the apparatus;

identifying a positioning beam failure based at least on a determination that the determined signal quality is below a first threshold and the time of arrival of the positioning reference signal exceeds a time of arrival of a previously measured positioning reference signal by at least a second threshold;

identifying that a positioning beam associated with the positioning reference signal is blocked based at least on a determination that the signal quality is below the first threshold and a difference between the time of arrival of the positioning reference signal and a time of arrival of a previously measured positioning reference signal is below a threshold difference;

identifying that a positioning beam failure is about to occur based at least on a determination that the signal quality exceeds the first threshold and the time of arrival of the positioning reference signal exceeds a time of arrival of a previously measured positioning reference signal by at least the second threshold;

identifying that a positioning beam failure has occurred based at least on a determination that the time of arrival of the positioning reference signal exceeds the time of arrival of the previously measured positioning reference signal by at least a third threshold which exceeds the second threshold, which indicates that the apparatus has one of moved a significant amount or a significant environment change has occurred;

identify that no action needs to be taken based at least on a determination that the signal quality exceeds the first threshold and a difference between the time of arrival of the positioning reference signal and a time of arrival of a previously measured positioning reference signal is below the threshold difference such that the time of arrival does not substantially change; and transmitting a beam management report about the identified positioning beam failure, wherein the transmission of the beam management report occurs by at least one of a direct transmission to the network device or in conjunction with the position measurement report, and wherein the beam management report is transmitted at least one of individually or with the positioning measurement report by at least one of LTE Positioning Protocol, Radio Resource Control signaling or a Media Access Control element, wherein at least one of the first, second and third thresholds is bandwidth dependent; and wherein at least one of the first, second and third thresholds is determined based upon the network device being utilized.

12. The method of claim 11, wherein identifying the positioning beam failure comprises:

in accordance with a determination that the signal quality is below a first threshold and the time of arrival of the positioning reference signal exceeds a time of arrival of a previously measured positioning reference signal by at least a second threshold, identifying that the positioning beam failure occurs.

13. The method of claim 11, wherein identifying the positioning beam failure comprises:

in accordance with a determination that the signal quality is below a first threshold and a difference between the time of arrival of the positioning reference signal and a time of arrival of a previously measured positioning reference signal is below a threshold difference, identifying that a positioning beam associated with the positioning reference signal is blocked.

14. The method of claim 11, wherein identifying the positioning beam failure comprises:

in accordance with a determination that the signal quality exceeds a first threshold and the time of arrival of the positioning reference signal exceeds a time of arrival of a previously measured positioning reference signal by at least a second threshold, identifying that the positioning beam failure is about to occur.

15. A non-transitory computer readable medium comprising program instructions that, when executed by an apparatus, cause the apparatus to perform at least the following:

determining signal quality and a time of arrival of a positioning reference signal received from a network device, wherein the positioning reference signal includes an on-demand positioning reference signal used for positioning;

measuring reference signal received power and the relative time of arrival of the on-demand positioning reference signal;

identifying a positioning beam failure based at least in part on the determined signal quality and the determined time of arrival of the positioning reference signal;

receiving from the network device a configuration about a criterion for position beam failure identification which indicates at least one threshold related to the signal quality and the time of arrival for identifying a position beam failure;

identifying a positioning beam failure based at least on the determined signal quality and the time of arrival of the positioning reference signal according to the configured criterion and the pre-configured criterion stored in the apparatus;

identifying a positioning beam failure based at least on a determination that the determined signal quality is below a first threshold and the time of arrival of the positioning reference signal exceeds a time of arrival of a previously measured positioning reference signal by at least a second threshold;

identifying that a positioning beam associated with the positioning reference signal is blocked based at least on a determination that the signal quality is below the first threshold and a difference between the time of arrival of the positioning reference signal and a time of arrival of a previously measured positioning reference signal is below a threshold difference;

identifying that a positioning beam failure is about to occur based at least on a determination that the signal quality exceeds the first threshold and the time of arrival of the positioning reference signal exceeds a time of arrival of a previously measured positioning reference signal by at least the second threshold;

identifying that a positioning beam failure has occurred based at least on a determination that the time of arrival of the positioning reference signal exceeds the time of arrival of the previously measured positioning reference signal by at least a third threshold which exceeds the second threshold, which indicates that the apparatus has one of moved a significant amount or a significant environment change has occurred;

identify that no action needs to be taken based at least on a determination that the signal quality exceeds the first threshold and a difference between the time of arrival of the positioning reference signal and a time of arrival of a previously measured positioning reference signal is below the threshold difference such that the time of arrival does not substantially change; and transmitting a beam management report about the identified positioning beam failure, wherein the transmission of the beam management report occurs by at least one of a direct transmission to the network device or in conjunction with the position measurement report, and wherein the beam management report is transmitted at least one of individually or with the positioning measurement report by at least one of LTE Positioning Protocol, Radio Resource Control signaling or a Media Access Control element, wherein at least one of the first, second and third thresholds is bandwidth dependent; and wherein at least one of the first, second and third thresholds is determined based upon the network device being utilized.

* * * * *